UNITED STATES PATENT OFFICE.

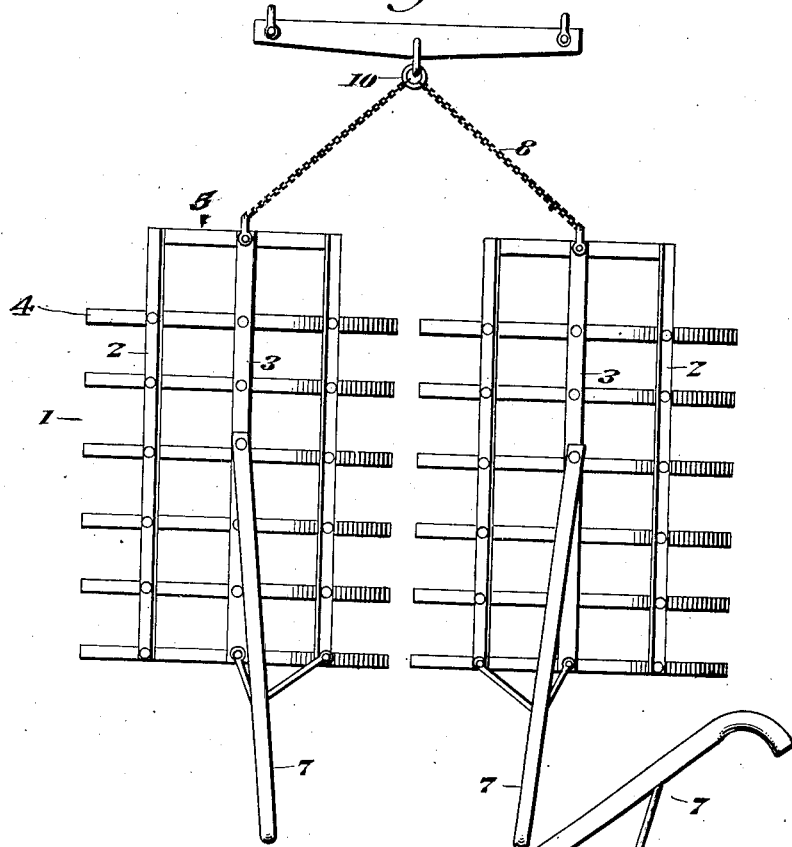

JOHN McKEAG, OF HAMLIN, ALBERTA, CANADA.

WEEDING-HARROW.

1,348,887.     Specification of Letters Patent.     Patented Aug. 10, 1920.

Application filed February 12, 1919. Serial No. 276,614.

*To all whom it may concern:*

Be it known that I, JOHN McKEAG, residing at Hamlin, in the Province of Alberta and Dominion of Canada, have invented new and useful Improvements in Weeding-Harrows, of which the following is a specification.

This invention is an improved harrow especially adapted for use in weeding potato and other crops and between the drills, the object of the invention being to provide an improved harrow of this class embodying a pair of sections each provided with transverse beams which are arcuate in shape and are arranged with their concave sides undermost and to which the harrow teeth are attached, and also embodying handles attached to the respective sections and draft means therefor which admit of independent movement of the harrow sections, so that the sections conform to the shape of the drills and are adapted to operate directly on the sides of the drills and also in the hollow between the drills.

With the above and other objects in view, the invention consists in the construction, combination and arrangement of devices hereinafter described and claimed.

In the accompanying drawings:

Figure 1 is a plan of a harrow constructed and arranged in accordance with my invention.

Fig. 2 is a longitudinal sectional view of the same.

Fig. 3 is a transverse sectional view of the same.

My improved weeding harrow comprises a pair of sections 1 each of which is of oblong rectangular form and comprises parallel side bars 2, and a center bar 3. Beams 4 are secured transversely on the longitudinal bars of each harrow section and are arcuate in form and arranged with their concave sides undermost. The harrow teeth 6 are carried by the arcuate cross beams. An arcuate shaped end member 5 is provided for each section.

Each harrow section has a handle 7, the front end of which is secured to the center bar of the section. The handles are disconnected from each other. A draft hitch 8 which is flexible, is flexibly connected by means of U-shaped members to the respective harrow sections and a suitable swingle tree is connected to the center of the hitch as at 10.

The harrow sections are thus arranged for independent movement so that they adapt themselves to the shape of the ridges and earth when the harrow is in operation. The harrow is especially adapted for use in weeding potato crops or other crops which are grown in drills, the concave under sides of the harrow sections being presented to the sides of the drills and closely conforming thereto in shape so that the harrow teeth act effectively in destroying the weeds and stirring and thoroughly loosening the soil, thereby also cultivating the crop. The draft horse walks in the hollow between the drills and the harrow sections are oppositely inclined and work on the opposing sides of the drills, as indicated in profile in Fig. 3.

Having thus described my invention, I claim:

A weeding harrow comprising a pair of sections, each section including spaced parallel bars, transversely disposed arcuate shaped tooth elements secured to the underside of said bars, a handle connected with the center bar of each section, an arcuate shaped end member for each section, a U-shaped member connecting said end member and central bar of each section, and flexible elements terminally connected with the U-shaped members, whereby said sections are adapted for independent movement.

In testimony whereof I affix my signature.

JOHN McKEAG.